(12) United States Patent
Bakeev et al.

(10) Patent No.: US 11,535,911 B2
(45) Date of Patent: Dec. 27, 2022

(54) METHOD FOR REDUCING FORMATION OF CASO4 AND FE2O3 CONTAINING DEPOSITS IN A PRESSURE OXIDATION AUTOCLAVE AND/OR ADJACENT CIRCUITS DURING PRESSURE OXIDATION OF GOLD-CONTAINING ORE

(71) Applicant: SOLENIS TECHNOLOGIES, L.P., Wilmington, DE (US)

(72) Inventors: Kirill N. Bakeev, Newark, DE (US); Andrew M. DiMaio, Oxford, PA (US)

(73) Assignee: Solenis Technologies, L.P., Wilmington, DE (US)

( * ) Notice: Subject to any disclaimer, the term of this patent is extended or adjusted under 35 U.S.C. 154(b) by 559 days.

(21) Appl. No.: 16/666,616

(22) Filed: Oct. 29, 2019

(65) Prior Publication Data
US 2021/0123117 A1 Apr. 29, 2021

(51) Int. Cl.
| | |
|---|---|
| *C22B 11/00* | (2006.01) |
| *C02F 5/08* | (2006.01) |
| *C02F 5/14* | (2006.01) |
| *C22B 3/00* | (2006.01) |
| *C02F 101/10* | (2006.01) |
| *C02F 101/20* | (2006.01) |
| *C02F 103/10* | (2006.01) |
| *C02F 103/16* | (2006.01) |

(52) U.S. Cl.
CPC .............. *C22B 11/04* (2013.01); *C02F 5/086* (2013.01); *C02F 5/145* (2013.01); *C22B 3/00* (2013.01); *C02F 2101/101* (2013.01); *C02F 2101/203* (2013.01); *C02F 2103/10* (2013.01); *C02F 2103/16* (2013.01)

(58) Field of Classification Search
None
See application file for complete search history.

(56) References Cited

U.S. PATENT DOCUMENTS

| | | | |
|---|---|---|---|
| 4,374,101 A | 2/1983 | Lussiez et al. | |
| 4,415,542 A | 11/1983 | Queneau et al. | |
| 4,810,405 A | 3/1989 | Waller et al. | |
| 2008/0035580 A1 | 2/2008 | de Rijk | |
| 2011/0174334 A1 | 7/2011 | Fan et al. | |
| 2011/0253628 A1 | 10/2011 | Blokker et al. | |
| 2013/0299432 A1 | 11/2013 | Borkar et al. | |
| 2016/0060147 A1 | 3/2016 | Moore et al. | |

FOREIGN PATENT DOCUMENTS

| | | | |
|---|---|---|---|
| EP | 538026 A1 * | 4/1993 | ................ C02F 5/14 |
| EP | 0538026 A1 | 4/1993 | |

OTHER PUBLICATIONS

Z. Amjad, "Investigations on the influence of phosphonates in dispersing iron oxide (rust) by polymeric additives for industrial water applications", International Journal of Corrosion, Scale Inhibition, 2014, 3, No. 2, 89-100.

Z. Amjad, "Iron oxide dispersants for industrial water systems: types, performance, and selection criteria", International Journal of Corrosion, Scale Inhibition, 2017, 6, No. 2, 162-179.

Thomas et al., "Pressure Oxidation Overview", Gold Ore Processing, Elsevier B.V., 2016, 341-358.

ISA/US, International Search Report and Written Opinion issued in Int. Appl. No. PCT/US2020/057290 dated Feb. 1, 2021.

* cited by examiner

*Primary Examiner* — Clare M Perrin
(74) *Attorney, Agent, or Firm* — Lorenz & Kopf, LLP

(57) ABSTRACT

Formation of $CaSO_4$ and $Fe_2O_3$ containing deposits is reduced in a pressure oxidation autoclave and/or adjacent circuits during pressure oxidation of gold-containing ore. The gold-containing ore is combined with water to create an aqueous slurry that is heated and introduced into the autoclave. The method includes providing a scale inhibitor that is free of an organic polymer and includes an inorganic phosphate according to formula (I), $(XPO_3)_m$, wherein X is Na, K, H, or combinations thereof, and m is at least about 6, an inorganic phosphate according to formula (II), $Y_{n+2}P_nO_{3n+1}$, wherein Y is Na, K, H, an organic phosphonate; or combinations thereof, and n is at least about 6. The method includes the step of combining the scale inhibitor and at least one of the gold-containing ore, the water, and the aqueous slurry to reduce scale.

20 Claims, No Drawings

METHOD FOR REDUCING FORMATION OF CASO4 AND FE2O3 CONTAINING DEPOSITS IN A PRESSURE OXIDATION AUTOCLAVE AND/OR ADJACENT CIRCUITS DURING PRESSURE OXIDATION OF GOLD-CONTAINING ORE

TECHNICAL FIELD

The present disclosure generally relates to systems and methods for reducing formation of $CaSO_4$ and/or $Fe_2O_3$ containing deposits in a pressure oxidation autoclave during pressure oxidation of gold-containing ore and more particularly relates to systems and methods utilizing a scale inhibitor for reducing formation of the $CaSO_4$ and/or $Fe_2O_3$ containing deposits.

BACKGROUND

In a broad sense, hydrometallurgy is a branch of metallurgy concerned with the science and art of extraction of metals from their ores by processes involving solutions in water. The processing of various types of ore and other materials can be conducted in various environments to produce a desired product. Although pressure oxidation of gold ores and concentrates does not directly recover gold in a strict sense of the above definition, it enables the gold to be recovered and accordingly is part of hydrometallurgy.

In hydrometallurgical processes for the extraction of metals from ores or secondary materials there are three basic procedures: (1) dissolution of a compound and/or metal from an ore or concentrate into a leach solution; (2) purification and/or upgrading of the leach solution, and (3) subsequent recovery of values from the purified solution. Besides the three basic procedures, there are processes in hydrometallurgy that are used, for example, as pretreatment steps. Such is the case in the pressure oxidation of refractory gold ores.

Within the gold industry, the term pressure oxidation is synonymous with pressure hydrometallurgy. Pressure oxidation refers to the oxidation of sulfides, such as pyrite [$FeS_2$] and marcasite [$FeS_2$], at elevated temperature and pressure. Oxidation releases encapsulated gold grains from the sulfides and makes the oxidation residue of the ore or concentrate more amenable for gold recovery by cyanidation in a subsequent leaching step. Pressure oxidation of gold ores is therefore a pretreatment leaching step to enhance gold recovery.

Pressure oxidation heats the gold-containing ore in an aqueous solution in closed vessels with sulfates being formed instead of sulfur dioxide gas. Within the gold industry, pressure oxidation of whole ores can be carried out using both alkaline and acidic processes and acidic pressure oxidation of sulfide concentrate are most commonly utilized. In these processes, slurries of ore from a grinding circuit are typically pumped to a series of thickeners and then typically to a series of acidulation tanks. Sulfuric acid is typically added to the slurries to destroy sufficient carbonate prior to entering a pressure oxidation autoclave. Process air is also typically injected into the acidulation tanks to aid in carbon dioxide removal. Then, the slurries are typically advanced from the acidulation tanks through a series of direct contact heater vessels before feeding into the pressure oxidation autoclave. The slurries are typically preheated as they pass through the heater vessels. The slurries typically enter the heater vessels at the top and cascade down the internal baffles, while flashed steam typically enters a lower section of the vessel and rises, contacting the slurries for direct heat transfer. The discharge from these vessels is then typically pumped into the pressure oxidation autoclave. The slurries then typically discharge from the autoclave and pass through a series of pressure letdown stages called flash vessels. Pressure and temperature are gradually let down to atmospheric pressure and temperature. The objective of the pressure-oxidation/autoclaving process is the destruction of the sulfides, such as pyrite, marcasite, or arsenopyrite, thereby liberating the occluded gold. The gold is then amenable to recovery by the cyanidation process.

Some of the oxidation and hydrolysis reactions that occur during this process are set forth below:

Oxidation Reactions $$2FeS_2 + 7O_2 + 2H_2O = 2FeSO_4 + 2H_2SO_4 \quad (1)$$

$$4FeSO_4 + 2H_2SO_4 + O_2 = 2Fe_2(SO_4)_3 + 2H_2O \quad (2)$$

$$4FeS_2 + 15O_2 + 2H_2O = 2Fe_2(SO_4)_3 + 2H_2SO_4 \quad (1)+(2)=(3)$$

$$4FeAsS + 11O_2 + 2H_2O = 4HAsO_2 + 4FeSO_4 \quad (4)$$

$$HAsO_2 + 2FeSO_4 + H_2SO_4 + O_2 = Fe_2(SO_4)_3 + H_3AsO_4 \quad (5)$$

$$4FeAsS + 13O_2 + 2H_2SO_4 + 2H_2O = 2Fe_2(SO_4)_3 + 2H_3AsO_4 + 2HAsO_2 \quad (4)+(5)=(6)$$

Hydrolysis Reactions $$Fe_2(SO_4)_3 + 3H_2O = Fe_2O_3(\text{hematite}) + 3H_2SO_4 \quad (7)$$

$$4FeS_2 + 15O_2 + 8H_2O = 2Fe_2O_3 + 8H_2SO_4 (\text{oxidation+hydrolysis}) \quad (3)+(7)=(8)$$

$$Fe_2(SO_4)_3 + 2H_2O = Fe(OH)SO_4(\text{basic iron sulphate}) + H_2SO_4 \quad (9)$$

$$3Fe_2(SO_4)_3 + 14H_2O = 2H_3OFe_3(SO_4)_2(OH)_6(\text{hydronium jarosite}) \quad (10)$$

$$3Fe_2(SO_4)_3 + M_2SO_4 + 12H_2O = 2MFe_3(SO_4)_2(OH)_6 + 6H_2SO_4 (M=Ag^+, NH_4^+, K^+, \tfrac{1}{2}Pb^{2+}) \quad (11)$$

$$Fe_2(SO_4)_3 + 2H_3AsO_4 = 2FeAsO_4 + 3H_2SO_4(\text{ferric arsenate}) \quad (12)$$

$$2FeAsS + 7O_2 + 2H_2O = 2FeAsO_4 + 2H_2SO_4(\text{oxidation+hydrolysis}) \quad (6)+(12)=(13)$$

During these processes, Fe/As sulfides in the gold-containing ore are released and oxidized, thus producing sulfates. During oxidation, the reaction is often quenched with process water which includes $CaOH_2$. Process water containing lime is also intrinsic to slurry fed into the reactor. This combination of reactants produces undesirable $CaSO_4$ scale that deposits onto on the equipment. Moreover, undesirable $Fe_2O_3$ and other Fe-containing scale is also produced during the pressure autoclave oxidation process and also accumulates on the equipment. This accumulation requires periodic shut-down and cleaning of the equipment thereby leading to delayed production and increased costs.

Accordingly, it is desirable to provide systems and methods for reducing formation of CaSO4 and/or Fe2O3 containing deposits in a pressure oxidation autoclave during pressure oxidation of gold-containing ore. Furthermore, other desirable features and characteristics will become apparent from the subsequent summary and detailed description and the appended claims, taken in conjunction with the foregoing technical field and background.

SUMMARY

This disclosure provides a method for reducing formation of $CaSO_4$ and $Fe_2O_3$ containing deposits in a pressure oxidation autoclave and/or adjacent circuits during pressure oxidation of gold-containing ore, wherein the gold-containing ore is combined with water to create an aqueous slurry that is heated and introduced into the pressure oxidation autoclave.

The method includes the step of providing a scale inhibitor that is free of an organic polymer and includes:

an inorganic phosphate according to formula (I), $(XPO_3)_m$ (I), wherein X is Na, K, H, or combinations thereof, and m is at least about 6, an inorganic phosphate according to formula (II), $Y_{n+2}P_nO_{3n+1}$ (II), wherein Y is Na, K, H, and n is at least about 6, an organic phosphonate (III); or combinations thereof.

The method also includes the step of combining the scale inhibitor and at least one of the gold-containing ore, the water, and the aqueous slurry to reduce the formation of scale in the pressure oxidation autoclave and/or adjacent circuits.

This disclosure also provides a composition for reducing $CaSO_4$ and $Fe_2O_3$ containing deposits in a pressure oxidation autoclave and/or adjacent circuits during pressure oxidation of gold-containing ore. The composition includes an aqueous slurry of the gold-containing ore and water and the aforementioned scale inhibitor.

This disclosure further provides a system for reducing formation of $CaSO_4$ and $Fe_2O_3$ containing deposits in a pressure oxidation autoclave and/or adjacent circuits during pressure oxidation of gold-containing ore. The system includes a substrate having a surface in contact with at least one of the gold-containing ore and/or an aqueous slurry of the gold-containing ore and water and the aforementioned scale inhibitor, such that the scale inhibitor exhibits a reduced formation of the $CaSO_4$ and $Fe_2O_3$ containing deposits on the surface as compared to a system free of the scale inhibitor.

DETAILED DESCRIPTION

The following detailed description is merely exemplary in nature and is not intended to limit the systems and methods as described herein. Furthermore, there is no intention to be bound by any theory presented in the preceding background or the following detailed description.

This disclosure provides a method for reducing formation of $CaSO_4$ and $Fe_2O_3$ containing deposits in a pressure oxidation autoclave and/or adjacent circuits during pressure oxidation of gold-containing ore, wherein the gold-containing ore is combined with water to create an aqueous slurry that is heated and introduced into the pressure oxidation autoclave. However, in alternative embodiments, it is contemplated that the method may be extended to be used for reducing formation of $CaSO_4$ and $Fe_2O_3$ containing deposits in a pressure oxidation autoclave and/or adjacent circuits during pressure oxidation of nickel or other sulfide metal-containing ore, wherein the nickel or other metal-containing ore is combined with water to create an aqueous slurry that is heated and introduced into the pressure oxidation autoclave. The other metal-containing ore may be chosen by one of skill in the art based on those metal ores which are known to be used in pressure oxidation autoclaves. It is also contemplated that the method may be extended to be used for reducing Fe-containing deposits that include any one or more of the aforementioned reaction products, e.g. those based on the hydrolysis reactions described in the introduction above.

The scale may be alternatively described as a deposit, e.g. a $CaSO_4$ and $Fe_2O_3$ containing deposit. The scale or deposits may include calcium sulfate ($CaSO_4$), and its crystallographic forms, including calcium sulfate dihydrate or gypsum ($CaSO_4 \cdot 2H_2O$), calcium sulfate hemihydrate ($CaSO_4 \cdot \frac{1}{2}H_2O$), and calcium sulfate anhydrite ($CaSO_4$). However, it is to be appreciated that the formation of scale resulting from other compounds may also be reduced by the scale inhibitor. The scale components may include also $Fe_2O_3$, $Fe(OH)SO_4$, $H_3OFe_3(SO_4)_2(OH)_6$, and other Fe-containing salts/oxides with limited solubility formed as the result of acid digestions of ore.

The scale inhibitor may be alternatively described as a deposit inhibitor, e.g. a $CaSO_4$ and $Fe_2O_3$ containing deposit inhibitor. The method includes the step of providing a scale inhibitor that is free of an organic polymer and includes: an inorganic phosphate according to formula (I), $(XPO_3)_m$ (I), wherein X is Na, K, H, or combinations thereof, and m is at least about 6, an inorganic phosphate according to formula (II), $Y_{n+2}P_nO_{3n+1}$ (II), wherein Y is Na, K, H, and n is at least about 6, an organic phosphonate (III), or a combination thereof. The method also includes the step of combining the scale inhibitor and at least one of the gold-containing ore, the water, and the aqueous slurry to reduce the formation of scale in the pressure oxidation autoclave and/or adjacent circuits. For example, the water may be further defined as cooling water of the autoclave and/or process water constituting ore slurry fed to the autoclave.

The scale inhibitor is free of the organic polymer. The terminology organic polymer refers to a polymer that is not the organic phosphonate (III). The organic polymer typically is or includes any one or more organic polymers that is known by those of skill in the art to be used for scale reduction. For example, the organic polymer may be described as polymerized maleates, polyacrylates, polyolefins, polystyrenes, and polymers or copolymers of alkenes, alkynes, etc. Alternatively, organic polymers may include radical initiated polymers formed from organic monomers. In one embodiment, the organic polymer is a styrene sulfonate (SS)-maleic acid (MA) copolymer. The terminology "free of" may describes amounts of less than 5, 4, 3, 2, 1, 0.5, 0.1, 0.05, or 0.01, weight percent based on a total weight of the scale inhibitor. Alternatively, the scale inhibitor may be entirely free of the organic polymer. Moreover, in various non-limiting embodiments, all values and ranges of values, both whole and fractional, including and between those set forth above, are hereby expressly contemplated for use herein.

The scale inhibitor may be, include, consist essentially of, or consist of:

(1) the inorganic phosphate according to formula (I), $$(XPO_3)_m \quad (I)$$

wherein X is Na, K, H, or combinations thereof, and m is at least about 6, (2) the inorganic phosphate according to formula (II), $$Y_{n+2}P_nO_{3n+1} \quad (II)$$

wherein Y is Na, K, H, or combinations thereof, and n is at least about 6, or (3) the organic phosphonate (III); or
a combination thereof.

In other words, the scale inhibitor may be, include, consist essentially of, or consist of (I), or (II), or (III), or (I) and (II), or (I) and (III), or (II) and (III), or (I), (II), and (III). Alternatively, the scale inhibitor may be, include, consist essentially of, or consist of (I) and any one or more additional compounds described below, (II) and any one or more additional compounds described below, (I) and (II) and any one or more additional compounds described below, (I) and (III) and any one or more additional compounds described below, (II) and (III) and any one or more additional compounds described below, or (I), (II), and (III) and any one or more additional compounds described below. Moreover, the scale inhibitor may be free of, or include less than about 5, 4, 3, 2, 1, 0.5, 0.1, 0.05, or 0.01, weight percent, of (I), (II), or (III), or any one or more additional compounds described below, so long as at least one of (I), (II), or (III) is used.

The scale inhibitor may include any weight ratio of (I), (II), and/or (III), and/or any one or more additional compounds below. For example, non-limiting examples of the weight ratio of (I):(II):(III) (and optionally any one or more additional compounds described below) may be:

about [(0 to 100); (5 to 95); (10 to 90); (15 to 85); (20 to 80); (25 to 75); (30 to 70); (35 to 65); (40 to 60); (45 to 55); or (50 to 55)] of (I):

about [(0 to 100); (5 to 95); (10 to 90); (15 to 85); (20 to 80); (25 to 75); (30 to 70); (35 to 65); (40 to 60); (45 to 55); or (50 to 55)] of (II):

about [(0 to 100); (5 to 95); (10 to 90); (15 to 85); (20 to 80); (25 to 75); (30 to 70); (35 to 65); (40 to 60); (45 to 55); or (50 to 55)] of (III):

about [(0 to 100); (5 to 95); (10 to 90); (15 to 85); (20 to 80); (25 to 75); (30 to 70); (35 to 65); (40 to 60); (45 to 55); or (50 to 55)] of any one or more additional compounds described below. It is also contemplated that any one or more of the aforementioned weight ratio values or ranges may be alternatively described as a weight percent value or range. Moreover, in various non-limiting embodiments, all values and ranges of values, both whole and fractional, including and between those set forth above, are hereby expressly contemplated for use herein.

Inorganic Phosphate (I):

In embodiments, the scale inhibitor is, includes, consists essentially of, or consists of, (1) an inorganic phosphate according to formula (I), $$(XPO_3)_m \quad (I)$$

wherein X is Na, K, H, or combinations thereof, and m is at least about 6. In certain embodiments, X is Na. The m of formula (I) may have a value of at least about 7, alternatively at least about 8, alternatively at least about 9, alternatively at least about 10, alternatively at least about 11, or alternatively at least about 12. The m of formula (I) may have a value of from about 6 to about 30, alternatively from about 6 to about 20, or alternatively from about 6 to about 10. Moreover, in various non-limiting embodiments, all values and ranges of values, both whole and fractional, including and between those set forth above, are hereby expressly contemplated for use herein.

Non-limiting examples of suitable inorganic phosphates of formula (I) include sodium hexametaphosphate $(NaPO_3)_6$, sodium heptametaphosphate $(NaPO_3)_7$, sodium octametaphosphate $(NaPO_3)_8$, sodium nonametaphosphate $(NaPO_3)_9$, and sodium decametaphosphate $(NaPO_3)_{10}$. In certain embodiments, the inorganic phosphate of formula (I) is, includes, consists essentially of, or consists of, sodium hexametaphosphate $(NaPO_3)_6$ ("SHMP") wherein m of formula (I) is about 6. SHMP may be commonly referred to in the art as "regular chain" SHMP. Moreover, in various non-limiting embodiments, all values and ranges of values, both whole and fractional, including and between those set forth above, are hereby expressly contemplated for use herein.

Inorganic Phosphate (II):

In embodiments, the scale inhibitor is, includes, consists essentially of, or consists of, (2) an inorganic phosphate according to formula (II), $$Y_{n+2}P_nO_{3n+1} \quad (II)$$

wherein Y is Na, K, H, or combinations thereof, and n is at least about 6.

In certain embodiments, Y is Na. The n of formula (II) may have a value of at least about 7, alternatively at least about 8, alternatively at least about 9, alternatively at least about 10, alternatively at least about 11, alternatively at least about 12, or alternatively at least about 21. The n of formula (II) may have a value of from about 6 to about 30, alternatively from about 8 to about 30, or alternatively from about 10 to about 30. Moreover, in various non-limiting embodiments, all values and ranges of values, both whole and fractional, including and between those set forth above, are hereby expressly contemplated for use herein.

Non-limiting examples of suitable inorganic phosphates of formula (II) include poly(phosphates), such as sodium hexaphosphate $(Na_8P_6O_{19})$, sodium heptaphosphate $(Na_9P_7O_{22})$, sodium octaphosphate $(Na_{10}P_8O_{25})$, sodium nonaphosphate $(Na_{11}P_9O_{28})$, sodium decaphosphate $(Na_{12}P_{10}O_{31})$, sodium hendecaphosphate $(Na_{13}P_{11}O_{34})$, and sodium dodecaphosphate $(Na_{14}P_{12}O_{37})$, and sodium henicosphosphate $(Na_{23}P_{21}O_{64})$. In certain embodiments, the inorganic phosphate of formula (II) is, includes, consists essentially of, or consists of, sodium dodecaphosphate wherein n of formula (II) is about 12. In various embodiments, the inorganic phosphate of formula (II) is, includes, consists essentially of, or consists of, poly(phosphates), such as sodium henicosphosphate, wherein n of formula (II) is about 21. Sodium dodecaphosphate or sodium henicosphosphate may be commonly referred to in the art as "long chain" SHMP. It is to be appreciated that common usage of the term "long chain" SHMP for sodium dodecaphosphate or sodium henicosphosphate does not accurately reflect the chemical structure for sodium dodecaphosphate or sodium henicosphosphate and may reference to any "long chain" SHMP having a chain length of at least about 12. Examples of suitable "long chain" SHMP include a "long chain" SHMP having an average chain length of about 13 and a number average molecular weight of about 1390 and a "long chain" SHMP having an average chain length of about 21 and a number average molecular weight of 2200. In addition, it is to be appreciated that the chain length of the inorganic phosphate may be based on average chain length and thus may not represent all species included in the designation. For example, while sodium dodecaphosphate $(Na_{14}P_{12}O_{37})$ has a chain length of about 12, the composition represented by sodium dodecaphosphate $(Na_{14}P_{12}O_{37})$ may include other inorganic phosphate species that do not have a chain length of about 12 so long as the average chain length of the composition is about 12. The scale inhibitor may include both the inorganic phosphate of formula (I) and the inorganic phosphate of formula (II). Moreover, in various non-limiting embodiments, all values and ranges of values, both whole and fractional, including and between those set forth above, are hereby expressly contemplated for use herein.

In various embodiments, an increase in chain length of the inorganic phosphates of formula (I) and formula (II) (i.e., increase in the value of m and n) provides an increase in binding affinity of the inorganic phosphates to calcium sulfate and Fe-containing deposits/scale thereby reducing the formation of scale. In contrast, inorganic phosphates having a chain length of less than about 6 (i.e., a value for m and n of less than about 6) tend to provide an inferior reduction in the formation of scale when utilized as a scale inhibitor without the presence of the inorganic phosphates of formula (I) and formula (II). Inorganic phosphates having a chain length of at least about 6 are suitable for binding to scale microcrystals thereby inhibiting scale formation and deposition described herein. Without being bound by theory, it is believed that inorganic phosphates having at least about 6 repeating units are effective due to the heterogeneous nature of the inorganic phosphates.

Organic Phosphonate (III):

In embodiments, the scale inhibitor further is, includes, consists essentially of, or consists of, (3) an organic phosphonate (III). The organic phosphonate may include 2-phosphonobutane-1,2,4-tricarboxylic acid ("PBTC"), 1-hydroxyethane-1,1-diphosphonic acid ("HEDP"), [bis(phosphonomethyl)amino] methylphosphonic acid ("ATMP"), bis(hexamethylenetriamine penta(methylene phosphonic acid)) ("BHMTPMP"), hexamethylenediamine tetra (methylene phosphonic acid) ("HMDTMP"), diethylenetriamine penta(methylene phosphonic acid) ("DTPMP"), or combinations thereof.

In certain embodiments, the organic phosphonate is, includes, consists essentially of, or consists of, 1-hydroxyethane-1,1-diphosphonic acid ("HEDP"), bis(hexamethylenetriamine penta(methylene phosphonic acid)) ("BHMTPMP"), hexamethylenediamine tetra(methylene phosphonic acid) ("HMDTMP"), diethylenetriamine penta (methylene phosphonic acid) ("DTPMP"), or combinations thereof.

In one embodiment, the organic phosphonate is, includes, consists essentially of, or consists of, 1-hydroxyethane-1,1-diphosphonic acid ("HEDP").

In another embodiment, the organic phosphonate is, includes, consists essentially of, or consists of, bis(hexamethylene triamine penta(methylene phosphonic acid)) ("BHMTPMP").

In one embodiment, the organic phosphonate is, includes, consists essentially of, or consists of, hexamethylenediamine tetra(methylene phosphonic acid) ("HMDTMPA").

In another embodiment, the organic phosphonate is, includes, consists essentially of, or consists of, diethylenetriamine penta(methylene phosphonic acid) ("DETPMPA").

In a further embodiment, the organic phosphonate is, includes, consists essentially of, or consists of, combinations of the above.

ADDITIONAL EMBODIMENTS

In one embodiment, the inorganic phosphate of formula (I) comprises sodium hexametaphosphate and wherein m of formula (I) is about 6. In another embodiment, the inorganic phosphate of formula (II) comprises sodium poly(phosphate) and wherein n of formula (II) is about 21.

The scale inhibitor may include, or be free of, an additional inorganic phosphate of formula (IV), the additional inorganic phosphate of formula (V), or combinations thereof. In embodiments, the scale inhibitor further includes, or is free of, an additional inorganic phosphate according to formulas (IV) or (V),

$(ZPO_3)_o$ (IV)

$Z_{p+2}P_pO_{3p+1}$ (V)

wherein Z is Na, K, H, or combinations thereof, o and p are each independently no greater than 4.

In one embodiment, the scale inhibitor further comprises: an additional inorganic phosphate according to formula (IV), $(ZPO_3)_o$ (IV) wherein Z is Na, K, H, or combinations thereof, and o is no greater than 4; an additional inorganic phosphate according to formula (V), $Z_{p+2}P_pO_{3p+1}$ (V) wherein Z is Na, K, H, or combinations thereof, and p is no greater than 4, or combinations thereof.

The o of formula (IV) may have a value of 3 or 4. The p of formula (V) may have a value of from 2 to 4. In certain embodiments, the additional inorganic phosphate is, includes, consists essentially of, or consists of, tetrasodium pyrophosphate ($Na_4P_2O_7$) ("TSPP"), sodium triphosphate ($Na_5P_3O_{10}$) ("STPP"), sodium trimetaphosphate ($NaPO_3)_3$ ("STMP"), or combinations thereof. Moreover, in various non-limiting embodiments, all values and ranges of values, both whole and fractional, including and between those set forth above, are hereby expressly contemplated for use herein.

The scale inhibitor including the combination of the inorganic phosphate of formulas (I) and/or (II) and/or the (III) organic phosphonate, and the additional inorganic phosphate according to formulas (IV) and/or (V), may provide an improved reduction of the formation of scale as compared to the scale inhibitor including only one of the above. Non-limiting examples of suitable scale inhibitors including include sodium henicosphosphate and DTPMP; sodium henicosphosphate and BHMTPMP; sodium henicosphosphate and HMDTMP; sodium henicosphosphate and TSPP; and sodium henicosphosphate and HEDP. The scale inhibitor may include the combinations of [the inorganic phosphate of formulas (I) and/or (II) and/or the (III) organic phosphonate] and [the additional inorganic phosphate according to formulas (IV) and/or (V)] in a weight ratio of from about 1:99 to 99:1, alternatively from about 15:85 to 85:15, alternatively from about 10:90 to 90:10, or alternatively from about 20:80 to 80:20. Moreover, in various non-limiting embodiments, all values and ranges of values, both whole and fractional, including and between those set forth above, are hereby expressly contemplated for use herein.

In one embodiment, the scale inhibitor is, includes, consists essentially of, or consists of, BHMTPMP is Bis(hexamethylenetriamine penta(methylene phosphonic Acid)).

In another embodiment, the scale inhibitor is, includes, consists essentially of, or consists of, DTPMP is diethylenetriamine penta(methylene phosphonic acid).

In another embodiment, the scale inhibitor is, includes, consists essentially of, or consists of, ATMP is amino trimethylene phosphonic acid.

In another embodiment, the scale inhibitor is, includes, consists essentially of, or consists of, SHMP is sodium hexametaphosphate.

In another embodiment, the scale inhibitor is, includes, consists essentially of, or consists of, DTPMP is diethylenetriamine penta(methylene phosphonic acid).

In another embodiment, the scale inhibitor is, includes, consists essentially of, or consists of, BHMTPMP is Bis (hexamethylenetriamine penta (methylene phosphonic acid)).

In another embodiment, the scale inhibitor is, includes, consists essentially of, or consists of, Na and/or K salts or organic phosphonates.

In a further embodiment, the organic phosphonate (III) comprises 2-phosphonobutane-1,2,4-tricarboxylic acid, 1-hydroxyethane-1,1-diphosphonic acid, bis(phosphonomethyl)aminotris(methylene phosphonic acid), bis(hexamethylenetriamine penta(methylene phosphonic acid)), hexamethylenediamine tetra(methylene phosphonic acid), diethylenetriamine penta(methylene phosphonic acid), or combinations thereof.

In a further embodiment, the organic phosphonate (III) comprises bis(hexamethylene triamine penta(methylene phosphonic acid)), hexamethylenediamine tetra(methylene phosphonic acid), diethylenetriamine penta(methylene phosphonic acid), 1-hydroxyethane-1,1-diphosphonic acid, or combinations thereof.

In a further embodiment, the method includes the step of adding oxygen to the pressure oxidation autoclave to react with the aqueous slurry at a temperature of from about 150° C. to about 250° C. and at a pressure of about 10 bar to about 35 bar, and wherein the scale inhibitor can be added to the aqueous slurry prior to introduction into the pressure oxidation autoclave. Moreover, in various non-limiting embodiments, all values and ranges of values, both whole and fractional, including and between those set forth above, are hereby expressly contemplated for use herein.

In a further embodiment, the $CaSO_4$ and $Fe_2O_3$ containing deposit can be reduced by at least 15% percent as compared to a control sample that can be free of the scale inhibitor. In other embodiments, the $CaSO_4$ and $Fe_2O_3$ containing deposit can be reduced by at least 20, 25, 30, 35, 40, 45, 50, 55, 60, 65, 70, 75, 80, 85, 90, 95, or even higher, % percent as compared to a control sample that can be free of the scale inhibitor. Typically, the amount of reduction is related to the harshness of conditions of the autoclave, as is understood by those of skill in the art. Moreover, in various non-limiting embodiments, all values and ranges of values, both whole and fractional, including and between those set forth above, are hereby expressly contemplated for use herein.

In a further embodiment, the scale reduction can be observed on at least one of a surface of a chamber of the autoclave, a slurry feed valve, a slurry discharge valve, a pump isolation valve, a depressurization valve, oxygen feed valve, and/or attached piping.

In various embodiments, a slurry from a grinding circuit, at approximately 35% solids can be pumped to one or more thickeners. Thickener underflow, at approximately 54% w/w solids, can then be pumped to a train of one or more acidulation tanks. Sulfuric acid can then be added to the slurry to destroy sufficient carbonate prior to entering an autoclave circuit. Process air can be also injected into the acidulation tanks to aid in carbon dioxide removal. Carbonate levels are typically reduced to <2% in the acidulation tanks.

In other embodiments, the slurry can be advanced from the acidulation tanks through a series of direct contact heater ("splash") vessels before feeding into the autoclave. The slurry can be preheated to a temperature of 165-175° C. as it passes through the splash vessels. The heat source in the splash vessels can be the flashed steam, which can be released from the slurry discharging from the autoclave as it passes through the pressure letdown ("flash") vessels. The slurry can enter the splash vessels at the top and cascades down the internal baffles, while the flashed steam enters the lower section of the vessel and rises, contacting the slurry for direct heat transfer. The bottom of each vessel can serve as a pump box for the interstage feed pumps.

The discharge from the high-pressure splash vessel can be pumped by two positive displacement piston-diaphragm (Geho) pumps into the autoclave. The pumps are operated in parallel with individual suction and discharge lines. Each pump can deliver approximately 60% of the required feed rate to the autoclave.

The autoclave is not particularly limited in size or construction and may be any known in the art. For example, in various embodiments, each autoclave can be divided into a series, e.g. five, compartments, with each compartment containing an agitator and injection pipes for oxygen, steam and water. Autoclave retention time typically ranges from 40 to 60 min, and the vessel operates at approximately 2900 kPag and 215-220° C. A corrosion-resistant membrane of the autoclave vessels can be 8-mm-thick chemical lead panel-bonded to the carbon steel shell, thermally protected by 3-mm Fibrefrax™ paper and 23-cm-thick courses of acid-resistant fireclay brick.

Sulfide sulfur oxidation through the autoclave can be typically of the order of 90-92%. Residual sulfide exiting the autoclave can be targeted at less than 0.2%. Values greater than 0.25% sulfide typically result in poorer gold recoveries in the circuit. Free-acid levels in the autoclave discharge are a function of sulfide and carbonate in the autoclave feed, but normally range from 10 to 25 g/L $H_2SO_4$.

In other embodiments, the slurry discharges from the autoclave and passes through a series of pressure letdown stages called flash vessels. Pressure and temperature are gradually let down to atmospheric pressure and 96° C., after passing through the flash vessel circuit. The steam released by the instantaneous reduction in pressure through the flash vessel can be ducted to the corresponding splash vessel. Slurry leaving the pressure letdown circuit can be then cooled from 96 to 48° C. by a series of, e.g. six to eight, shell and tube heat exchangers. The cooling water can be on the shell side of the heat exchanger and the slurry passes through the tubes. In summary, the flash/splash system can be a heat-recovery system, which minimizes the use of direct steam with inherent operating cost benefits. After the slurry passes through the slurry coolers it can be pumped to two parallel trains of neutralization tanks, where the pH value can be elevated.

In further embodiments, a neutralized slurry from the pressure-oxidation circuit can be pumped to two parallel trains of eight tanks for gold extraction and subsequent recovery of gold in a conventional Zadra elution circuit. Suitable ancillary facilities can be installed to supply flocculant, sulfuric acid, oxygen, lime, steam. and compressed air to the autoclave facility. The control system can be a Bailey Network 90™ distributed control system (DCS).

In even further embodiments, the autoclave system can use an existing crushing and grinding circuit and stored slurry in tanks for continuous autoclave processing. Ground slurry can be thickened in a 20-m-diameter, high-rate thickener to 50% solids and pumped to three stages of heat-up using splash towers to which recycled steam from the autoclave discharge can be introduced. Pumping can be accomplished by one positive displacement, piston-diaphragm pump (Geho). Pressure and temperature could be raised from atmospheric and ambient to 3135 kPag and 215° C., respectively. Slurry can be then introduced into the autoclave, a horizontal, cylindrical unit, 3.7 m in diameter and 14 m long via a condenser. The autoclave can be carbon steel and lined with a layer of acid resistant brick refractory material. It can be separated into four compartments by stainless-steel baffles. Each compartment can be separately agitated by single-impeller mixers. The tip speed of the agitator blades can be kept below 3.8 m/s to prevent accelerated wear on the blades. Also, the agitator impeller can be set at one diameter above the brickwork to prevent brick erosion but still maintain solid suspension. Oxygen, supplied from a storage tank, can be introduced to each autoclave compartment. Liquid oxygen can be delivered by truck to a storage tank from a nearby oxygen plant. The oxygen can be vaporized and introduced to each compartment. Exiting slurry passed through three stages of pressure letdown and flash steam can be condensed in corresponding preheated splash tanks. Chokes could be situated between each stage of letdown. Slurry residence time can be typically 90 min.

Slurry from the final pressure letdown stage, at about 95° C., can be pumped through heat exchangers to bring the temperature down to about 25° C. for introduction to the circuit. Three separate tanks could be dedicated to the autoclaved product. After leaching, the slurry can be introduced to the existing tailings circuit. Loaded carbon from the circuit can be screened separately and introduced to the stripping circuit. Sulfur content of the refractory ore averaged about 0.8% sulfide sulfur and required continual introduction of steam to the process. An 11,000 kg/h propane-fired boiler provided the required steam.

In a further embodiment, sulfides are floated into a concentrate ahead of the autoclave circuit followed by acid pretreatment. Prior to autoclaving the slurry can be thickened in a thickener, acidic overflow passing to a treatment plant. The sulfide concentrate can have sufficient sulfides to allow an autogenous reaction in the autoclave, thereby precluding the need for slurry heater vessels as in whole-ore treatment. The slurry heaters can be the heat-recovery system for the whole-ore treatment route, thereby reducing indirect heating costs.

The compositions, methods, systems, components, etc. of the instant disclosure can be used at any one or more of the aforementioned points in an autoclave system, process, or ancillary equipment.

Composition for Reducing $CaSO_4$ and $Fe_2O_3$ Containing Deposits:

This disclosure also provides a composition for reducing $CaSO_4$ and $Fe_2O_3$ containing deposits in a pressure oxidation autoclave and/or adjacent circuits during pressure oxidation of gold-containing ore. The composition includes an aqueous slurry of the gold-containing ore and water and the aforementioned scale inhibitor. In other words, the composition itself can include any of the components described above.

System for Reducing $CaSO_4$ and $Fe_2O_3$ Containing Deposits:

This disclosure further provides a system for reducing formation of $CaSO_4$ and $Fe_2O_3$ containing deposits in a pressure oxidation autoclave and/or adjacent circuits during pressure oxidation of gold-containing ore. The system includes a substrate having a surface in contact with at least one of the gold-containing ore and/or an aqueous slurry of the gold-containing ore and water and the aforementioned scale inhibitor, such that the scale inhibitor exhibits a reduced formation of the $CaSO_4$ and $Fe_2O_3$ containing deposits on the surface as compared to a system free of the scale inhibitor. In other words, the system can include the composition itself which can include any of the components described above.

The system includes a substrate having a surface in contact with at least one of the gold-containing ore and/or an aqueous slurry of the gold-containing ore and water. The substrate may be any portion of the pressure oxidation autoclave and/or adjacent circuits including, but not limited to, at least one of a surface of a chamber of the autoclave, a slurry feed valve, a slurry discharge valve, a pump isolation valve, a depressurization valve, oxygen feed valve, and/or attached piping. Alternatively, any component described above may be the substrate. The system also includes the aforementioned scale inhibitor. The system exhibits a reduced formation of the $CaSO_4$ and $Fe_2O_3$ containing deposit on the surface as compared to a system free of the scale inhibitor. In one embodiment, the surface is a surface of a pressure oxidation autoclave.

Additional Method:

The disclosure also provides an additional method. This method includes the step of contacting the aforementioned composition with the aforementioned substrate. In other words, the method may be described as a method of treating an autoclave and/or any adjacent circuits including, but not limited to, at least one of a surface of a chamber of the autoclave, slurry feed valve, a slurry discharge valve, a pump isolation valve, a depressurization valve, and/or attached piping.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

EXAMPLES

To evaluate scale deposition reduction, a series of experiments were conducted. The equipment used included: a dry heat shaker table; C22 alloy jars and Teflon lids; bottle-top dispensers; pipetters with tips; a dessicator; an oven (with racks and heat/acid resistant secondary container); and a satellite waste drum. The reagents used were: $CaCl_2.2H_2O$; 29% (20 v/v) Sulfuric Acid, density=1.21; $FeSO_4.7H_2O$; and various antiscalant product solutions in DI water diluted to about 1 wt %.

The procedure used is as follows:

Stock Solution:
1. In a 1 liter volumetric flask that is half-filled with DI water, add 26.46 g of $CaCl_2.2H_2O$ and mix until dissolved. Fill the flask to the line with DI water.
2. In a 1 liter volumetric flask that is half-filled with DI water, add 100 g of $FeSO_4.7H_2O$ and mix until dissolved. Fill the flask to the line with DI water.
3. Transfer the stock solutions to labeled bottles with bottle-top dispensers.

Test Preparation:
4. Record the weights of the C22 alloy jars, without their lids.

5. Into the 8 oz labeled C22 alloy jars measure 50 mL of the CaCl$_2$.2H$_2$O stock solution using a bottle-top dispenser.
6. Add 86 mL of H$_2$O for 2.5% Sulfuric Acid or 72 mL of H$_2$O for 5% Sulfuric Acid.
7. Add 50 mL of the FeSO$_4$.7H$_2$O stock solution (if testing a 0.5% Fe) using a bottle-top dispenser.
8. Add the balance as Sulfuric Acid:
    i. If testing a 2.5% Sulfuric Acid solution:
        Add 14 mL of 20 v/v Sulfuric Acid using a serological pipette
    ii. If testing a 5.0% Sulfuric Acid solution:
        Add 28 mL of 20 v/v Sulfuric Acid using a serological pipette.
9. Add antiscalant stock solution (dilute antiscalant stock solution with DI water to form a 1 wt % antiscalant stock solution in water.
10. Put covered jars on the shaker at 60° C.-80° C., 150 rpm for 6 hours (unless indicated differently).
11. After 6 hours, turn the heat off on the shaker table, but continue to shake the jars without allowing jars to settle.
12. Take off Teflon cap form each test jar one at a time.
13. Decant fluid phase into waste container.
14. Allow the Jars to dry in an oven upside down on a rack over a secondary container (to prevent any residual acid from damaging the oven) over night at 105° C.
15. After the Jars are dry place them into a desiccators for about 1 hours to cool down.
16. After the jars are cooled down weigh the jars (without lids) and by weight difference find the amount of deposited scale.
17. Assess scale deposition.

Calculations:
% Deposition Inhibition by Mass:

$$\frac{(C - A) - (D - B)}{C - A} \times 100$$

Wherein:
A—Mass of empty Blank Jar (before the test)
B—Mass of empty Treated Jar (before the test)
C—Mass of dried Blank Jar (after the test)
D—Mass of dried Treated Jar (after the test)

Blank jars (the first two jars in a set) do not have any antiscalant in them and are used to compare to the treated jars. There are anywhere from 8 to 16 treated jars used in each test. Each chemical/test is run in triplicate.

C22 Alloy Jars:
    Inner Area—0.019255 m$^2$
    Height—13 cm
    Inner diameter—5.4 cm
    Outer diameter—6.0 cm In Various Tests, the Stock & Final Concentrations can be Approximately as Follows:
Stock Ca-ion in CaCl$_2$.2H$_2$O: (40/147)*26.46 g=7200 ppm per 1 L
Final Ca-ion in CaCl$_2$.2H$_2$O: 50 g/200 g*7200 ppm=1800 ppm=1.8 g/L
Stock Fe-ion in FeSO$_4$.7H$_2$O: (55.85/278.01)*100 g=20089 ppm per 1 L
Final Fe-ion in FeSO$_4$.7H$_2$O: 50 g/200 g*20089 ppm=5022 ppm or ~5 g/l
Stock Sulfuric acid: 29% (20 v/v) Sulfuric Acid, density=1.21
Final Sulfuric acid: (14.25 mL*1.21 g/ml)*29%/200 g=2.5% or 25 g/l
Final Sulfuric acid: (28.5 mL*1.21 g/ml)*29%/200 g=5% or 50 g/l
Final Sulfate-ion for 2.5% acid: (96.06/98.08)*25000 ppm=24485 ppm
Final Sulfate-ion for 5.0% acid: (96.06/98.08)*50000 ppm=48970 ppm
Stock SO$_4$-ion in FeSO$_4$.7H$_2$O: (96.06/278.01)*100 g=34553 ppm per 1 L
Final SO$_4$-ion in FeSO$_4$.7H$_2$O: 50 g/200 g*34553 ppm=8638 ppm Table 1 below sets forth average % scale deposition reductions calculated using the method described above for solutions including 5% Sulfuric acid; 2000 ppm Ca; 23000 ppm Fe.

The dosing of all of the scale inhibitors listed below is based on the percent of solids of the scale inhibitor in solution, in case of dry powder products used, it would be 100%. The temperature for each test was 80° C., unless indicated differently. The duration of the test was 6 hours, unless otherwise specified.

TABLE 1

| 5% Sulfuric acid; 2000 ppm Ca; 23000 ppm Fe | | | |
| --- | --- | --- | --- |
| Example | Scale Inhibitor | Average % Scale Deposition Reduction | Standard Deviation |
| 1 | blank | N/A | N/A |
| 2 (inventive) | SHMP 50 ppm solids | −7.42 | 4.74 |
| 3 (inventive) | SHMP 100 ppm solids | −27.46 | 10.64 |
| 4 (comparative) | Poly (NIPAM)-caboxylic acid 50 ppm solids | −17.25 | 14.43 |
| 5 (comparative) | Poly(NIPAM)-carboxylic acid 100 ppm solids | −22.92 | 19.55 |

Poly(NIPAM)-carboxylic acid is Poly(N-isopropylacrylamide), terminated with carboxylic group, available from Aldrich SHMP is sodium hexametaphosphate.

Table 2 below sets forth average % scale deposition reductions calculated using the method described above for solutions including 2.5% Sulfuric acid; 1200 ppm Ca; 5000 ppm Fe. Product dosages were 100 ppm solids further below in all examples.

TABLE 2

| 2.5% Sulfuric acid; 1200 ppm Ca; 5000 ppm Fe | | | |
| --- | --- | --- | --- |
| Example | Scale Inhibitor | Average % Scale Deposition Reduction | Standard Deviation |
| 6 | blank | N/A | N/A |
| 7 (comparative) | EXP 6490 (100 ppm) | −18.79 | 23.81 |
| 8 (comparative) | Poly(NIPAM)-carboxylic acid (100 ppm) | −12.73 | 7.86 |
| 9 (inventive) | SHMP (100 ppm) | −4.24 | 7.47 |
| 10 (inventive) | ATMP (100 ppm) | −3.03 | 6.18 |

TABLE 2-continued 2.5% Sulfuric acid; 1200 ppm Ca; 5000 ppm Fe

| Example | Scale Inhibitor | Average % Scale Deposition Reduction | Standard Deviation |
|---|---|---|---|
| 11 (inventive) | SHMP/ATMP (1:1 blend; 100 ppm) | −9.09 | 18.18 |

EXP 6490 is sulfonated acrylate terpolymer available from Akzo Nobel.

ATMP is [bis(phosphonomethyl)amino] methylphosphonic acid.

SHMP is sodium hexametaphosphate.

Table 3 below sets forth average % scale deposition reductions calculated using the method described above for solutions including 2.5% sulfuric acid, variable 1800-2500 ppm Ca-ion with no Fe-ion added.

TABLE 3

2.5% Sulfuric acid; 1800 ppm (#15-17) and 2500 ppm (#12-14) Ca; 0 ppm Fe

| Example | Scale Inhibitor | Average % Scale Deposition Reduction | Standard Deviation |
|---|---|---|---|
| 12 | Blank 2500 ppm Ca | N/A | N/A |
| 13 (inventive) | SHMP (100 ppm) | 67.54 | 2.21 |
| 14 (inventive) | ATMP (100 ppm) | 12.55 | 3.95 |
| 15 | Blank 1800 ppm Ca | N/A | N/A |
| 16 (inventive) | SHMP (100 ppm) | 91.06 | 0.83 |
| 17 (inventive) | ATMP (100 ppm) | 33.49 | 3.32 |

The Scale Inhibitor of Examples 13 and 16 is the same as that of Example 9.

Table 4 below sets forth average % scale deposition reductions calculated using the method described above for solutions including 5% sulfuric acid; 1800 ppm Ca; No Fe.

TABLE 4

5% sulfuric acid; 1800 ppm Ca; No Fe

| Example | Scale Inhibitor | Average % Scale Deposition Reduction | Standard Deviation |
|---|---|---|---|
| 18 | blank | N/A | N/A |
| 19 (inventive) | SHMP (100 ppm) | 70.72 | 3.78 |
| 20 (inventive) | SHMP/BHMTPMP (4:1) (100 ppm) | 72.69 | 5.27 |
| 21 (inventive) | BHMTPMP (100 ppm) | 81.13 | 2.95 |
| 22 (inventive) | DTPMP (100 ppm) | 60.76 | 19.66 |
| 23 (inventive) | ATMP (100 ppm) | 26.56 | 6.42 |

DTPMP is diethylenetriamine penta(methylene phosphonic acid)

BHMTPMP is bis(hexamethylenetriamine penta-(methylene phosphonic acid)).

Table 5 below sets forth average % scale deposition reductions calculated using the method described above for solutions including 2.5% sulfuric acid; 3500 ppm Ca; Variable Fe.

TABLE 5

2.5% sulfuric acid; 3500 ppm Ca; Variable Fe

| Example | Scale Inhibitor | Average % Scale Deposition Reduction | Standard Deviation |
|---|---|---|---|
| 24 | Blank 5 ppm Fe | N/A | N/A |
| 25 (inventive) | SHMP 100 ppm (5 ppm Fe) | 42.94 | 7.82 |
| 26 | Blank 10 ppm Fe | N/A | N/A |
| 27 (inventive) | SHMP 100 ppm (10 ppm Fe) | 34.15 | 8.52 |
| 28 | Blank 50 ppm Fe | N/A | N/A |
| 29 (inventive) | SHMP 100 ppm (50 ppm Fe) | 21.87 | 0.17 |

Table 6 below sets forth average % scale deposition reductions calculated using the method described above for solutions including 2.5% sulfuric acid; 1800 ppm Ca; Variable Fe.

TABLE 6

2.5% sulfuric acid; 1800 ppm Ca; Variable Fe

| Example | Scale Inhibitor | Average % Scale Deposition Reduction | Standard Deviation |
|---|---|---|---|
| 30 | Blank 10 ppm Fe | N/A | N/A |
| 31 (inventive) | SHMP (10 ppm Fe) | 79.17 | 9.86 |
| 32 | Blank 50 ppm Fe | N/A | N/A |
| 33 (inventive) | SHMP (50 ppm Fe) | 68.40 | 7.24 |
| 34 | Blank 100 ppm Fe | N/A | N/A |
| 35 (inventive) | SHMP (100 ppm Fe) | 39.31 | 3.88 |

Table 7 below sets forth average % scale deposition reductions calculated using the method described above for solutions including 2.5% sulfuric acid; 1800 ppm Ca; Variable Fe.

TABLE 7

| | | 2.5% sulfuric acid; 1800 ppm Ca; Variable Fe | |
|---|---|---|---|
| Example | Scale Inhibitor | Average % Scale Deposition Reduction | Standard Deviation |
| 36 | Blank 0 ppm Fe | N/A | N/A |
| 37 (comparative) | DTPMP/SS-MA copolymer (1:3) (0 ppm Fe) | 8.55 | 3.27 |
| 38 | Blank 100 ppm Fe | N/A | N/A |
| 39 (comparative) | DTPMP/SS-MA copolymer (1:3) (100 ppm Fe) | 4.90 | 2.38 |

Examples 37 and 39 contain a physical blend of DTPMP and styrene sulfonate (SS)-maleic acid (MA) copolymer, which is a synthetic organic polymer.

Table 8 below sets forth average % scale deposition reductions calculated using the method described above for solutions including 2.5% sulfuric acid; 1300 ppm Ca; 5000 ppm Fe; 3 hrs test duration at 60° C.

TABLE 8

| | 2.5% sulfuric acid; 1300 ppm Ca; 5000 ppm Fe; 3 hrs; 60° C. | | |
|---|---|---|---|
| Example | Scale Inhibitor | Average % Scale Deposition Reduction | Standard Deviation |
| 40 | Blank | N/A | N/A |
| 41 (inventive) | 1-SHMP/BHMTPMP (4:1) (150 ppm) | 22.19 | 7.46 |

1-SHMP is a long-chain SHMP of $Y_n+2P_nO_{3n+1}$ (II) wherein n has an average of about 21 and Y is Na.

Tables 1-8 show the impact of sulfuric acid concentration, Ca-ion, Fe-ion and product dosages on various products scale inhibition as measured by the scale deposition method described above. Overall, products inhibition efficacy decreases with increase in sulfuric acid concentration, increase on Ca-ion concentration, and increase in Fe-ion concentration. Even at very high Fe-ion concentrations, such as in Table 8, product inhibition efficacy was retained above zero.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A method for reducing formation of $CaSO_4$ and $Fe_2O_3$ containing deposits in a pressure oxidation autoclave and/or adjacent circuits during pressure oxidation of gold-containing ore, wherein the gold-containing ore is combined with water to create an aqueous slurry that is heated and introduced into the pressure oxidation autoclave, said method comprising:
providing a scale inhibitor that is free of an organic polymer and comprises;
an inorganic phosphate according to formula (I), $$(XPO_3)_m \quad (I)$$

wherein X is Na, K, H, or combinations thereof, and m is at least about 6,
an inorganic phosphate according to formula (II), $$Y_{n+2}P_nO_{3n+1} \quad (II)$$

wherein Y is Na, K, H, or combinations thereof, and n is at least about 6, or
an organic phosphonate (III); or
a combination thereof;
combining the scale inhibitor and at least one of the gold-containing ore, the water, and the aqueous slurry; and
contacting the combination of the scale inhibitor and at leas one of the gold-containing ore, the water, and the aqueous slurry with the pressure oxidation autoclave and/or adjacent circuits to reduce the formation of scale in the pressure oxidation autoclave and/or adjacent circuits.

2. The method of claim 1, wherein the inorganic phosphate of formula (I) comprises sodium hexametaphosphate and wherein m of formula (I) is about 6.

3. The method of claim 1, wherein the inorganic phosphate of formula (II) comprises sodium poly(phosphate) and wherein n of formula (II) is about 21.

4. The method of claim 1, wherein the organic phosphonate (III) is bis(hexamethylenetriamine penta(methylene phosphonic acid)).

5. The method of claim 1, wherein the organic phosphonate (III) comprises 2-phosphonobutane-1,2,4-tricarboxylic acid, 1-hydroxyethane-1,1-diphosphonic acid, bis(phosphonomethyl)aminotris(methylene phosphonic acid), hexamethylenediamine tetra(methylene phosphonic acid), diethylenetriamine penta(methylene phosphonic acid), or combinations thereof.

6. The method of claim 1, further comprising the step of adding oxygen to the pressure oxidation autoclave to react with the aqueous slurry at a temperature of from about 150° C. to about 250° C. and at a pressure of about 10 bar to about 35 bar, and wherein the scale inhibitor is added to the aqueous slurry prior to introduction into the pressure oxidation autoclave.

7. The method of claim 1, wherein the $CaSO_4$ and $Fe_2O_3$ containing deposit is reduced by at least 15% percent as compared to a control sample that is free of the scale inhibitor.

8. The method of claim 7 wherein the scale reduction is observed on at least one of a surface of a chamber of the autoclave, a slurry feed valve, a slurry discharge valve, a pump isolation valve, a depressurization valve, and/or attached piping.

9. A composition for reducing $CaSO_4$ and $Fe_2O_3$ containing deposit in a pressure oxidation autoclave and/or adjacent circuits during pressure oxidation of gold-containing ore, said composition comprising:
an aqueous slurry of the gold-containing ore and water; and
a scale inhibitor that is free of an organic polymer and comprises;

an inorganic phosphate according to formula (I), $$(XPO_3)_m \qquad (I)$$

wherein X is Na, K, H, or combinations thereof, and m is at least about 6, an inorganic phosphate according to formula (II), $$Y_{n+2}P_nO_{3n+1} \qquad (II)$$

wherein Y is Na, K, H, or combinations thereof, and n is at least about 6,
an organic phosphonate (III); or
a combination thereof.

10. The composition of claim 9, wherein the inorganic phosphate of formula (I) comprises sodium hexametaphosphate and wherein m of formula (I) is about 6.

11. The composition of claim 9, wherein the inorganic phosphate of formula (II) comprises sodium poly(phosphate) and wherein n of formula (II) is about 21.

12. The composition of claim 9, wherein the organic phosphonate is bis-(hexamethylene-triamine penta (methylene phosphonic acid)).

13. The composition of claim 9, wherein the organic phosphonate (III) comprises 2-phosphonobutane-1,2,4-tricarboxylic acid, 1-hydroxyethane-1,1-diphosphonic acid, bis(phosphonomethyl)aminotris(methylene phosphonic acid), hexamethylenediamine tetra(methylene phosphonic acid), diethylenetriamine penta(methylene phosphonic acid), or combinations thereof.

14. A system for reducing formation of $CaSO_4$ and $Fe_2O_3$ containing deposit in a pressure oxidation autoclave and/or adjacent circuits during pressure oxidation of gold-containing ore, said system comprising:
   a substrate of the pressure oxidation autoclave and/or adjacent circuits having a surface in contact with at least one of the gold-containing ore and/or an aqueous slurry of the gold-containing ore and water; and
   a scale inhibitor that is disposed in the pressure oxidation autoclave and/or adjacent circuits, that is free of an organic polymer, and comprises;
   an inorganic phosphate according to formula (I), $$(XPO_3)_m \qquad (I)$$

wherein X is Na, K, H, or combinations thereof, and m is at least about 6,
an inorganic phosphate according to formula (II), $$Y_{n+2}P_nO_{3n+1} \qquad (II)$$

wherein Y is Na, K, H, or combinations thereof, and n is at least about 6,
an organic phosphonate (III); or
a combination thereof;
wherein the system comprising the scale inhibitor exhibits a reduced formation of the $CaSO_4$ and $Fe_2O_3$ containing deposit on the surface as compared to a system free of the scale inhibitor.

15. The system of claim 14, wherein the inorganic phosphate of formula (I) comprises sodium hexametaphosphate and wherein m of formula (I) is about 6.

16. The system of claim 14, wherein the inorganic phosphate of formula (II) comprises sodium poly(phosphate) and wherein n of formula (II) is about 21.

17. The system of claim 14, wherein the surface is a surface of a pressure oxidation autoclave.

18. The system of claim 14, wherein the inorganic phosphate of formula (I) comprises sodium hexametaphosphate and wherein m of formula (I) is about 6 and wherein the inorganic phosphate of formula (II) comprises sodium poly(phosphate) and wherein n of formula (II) is about 21.

19. The system of claim 14, wherein the organic phosphonate is bis-(hexamethylene-triamine penta (methylene phosphonic acid)).

20. The system of claim 14, wherein the organic phosphonate (III) comprises the organic phosphonate (III) comprises 2-phosphonobutane-1,2,4-tricarboxylic acid, 1-hydroxyethane-1,1-diphosphonic acid, bis(phosphonomethyl)aminotris (methylene phosphonic acid), hexamethylenediamine tetra(methylene phosphonic acid), diethylenetriamine penta(methylene phosphonic acid), or combinations thereof.

\* \* \* \* \*